Aug. 1, 1944.          R. L. KERR          2,354,864
                      ROTARY PLUG VALVE
                     Filed Aug. 11, 1941

Inventor
Ralph L. Kerr
By
Attorney.

Patented Aug. 1, 1944

2,354,864

UNITED STATES PATENT OFFICE 2,354,864

ROTARY PLUG VALVE

Ralph L. Kerr, Houston, Tex.

Application August 11, 1941, Serial No. 406,385

2 Claims. (Cl. 251—93)

The present invention relates to improvements in rotary plug valves.

The primary object of the invention is to provide a valve of the above-mentioned type which will be lubricated upon operation of the plug by means of a force feed plunger controllable by the movements of the plug valve stem.

A further object of the invention is to provide a rotary plug valve of the above-mentioned type having a force feed plunger for supplying a lubricant under pressure to the contacting faces of the plug whereby the amount of lubricant in the force feed chamber may be determined by the position of the force feed plunger.

A still further object of the invention is to provide a rotary plug valve of the above-mentioned type in which the plug will be lubricated automatically during the closing movement of the valve so that the valve seat immediately surrounding the plug will be packed with a film of grease or lubricant and prevent leakage between the moving parts of the valve and valve casing.

A still further object of the invention is to provide a rotary plug valve of the above-mentioned character in which a measured quantity of lubricant is fed between the valve plug and casing adjacent the ports of the valve casing upon operation of the valve plug during its opening and closing movement.

Figure 1:
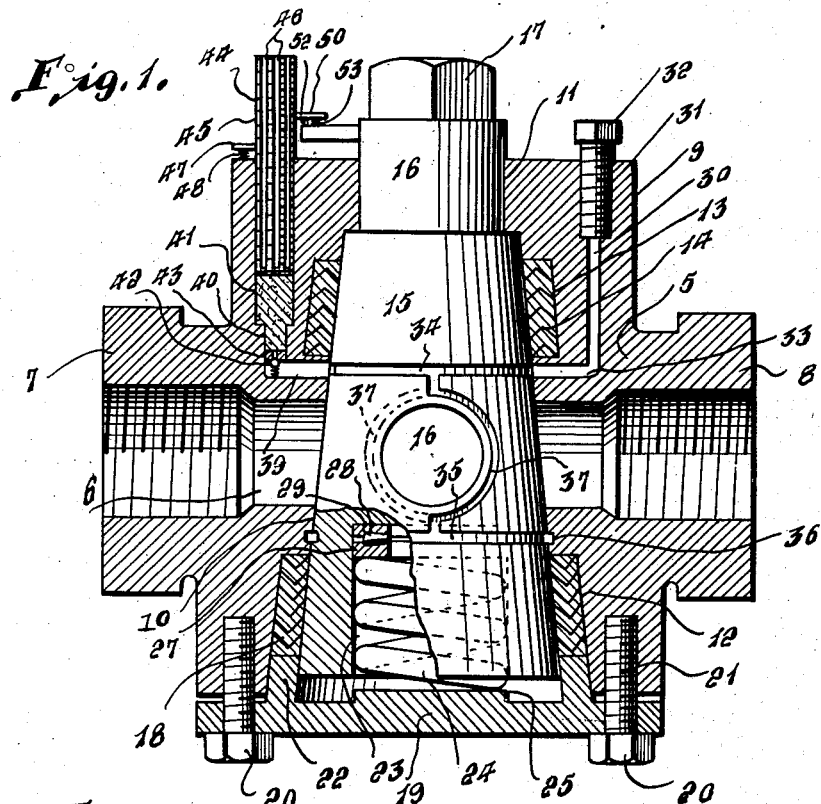
Figure 2:
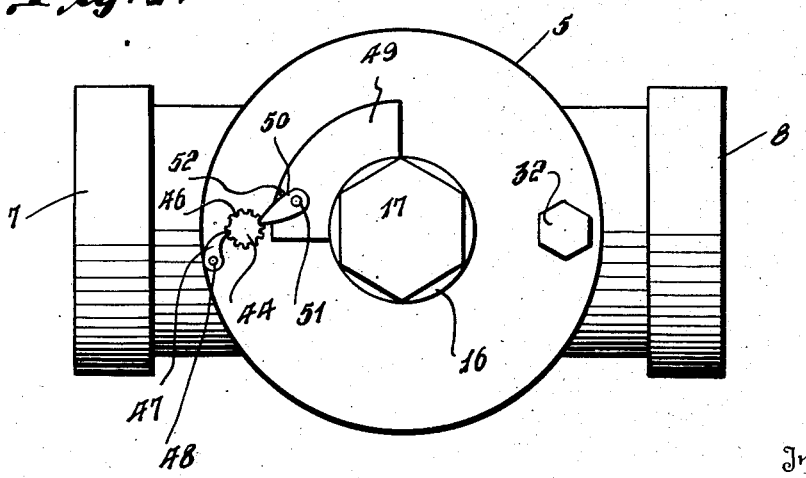

Other objects and advantages of the invention will become apparent during the course of the description of the accompanying drawing, wherein, Figure 1 is a vertical cross-sectional view of the valve embodying the invention, illustrating in detail the arrangement of the force feed plunger and the various ducts and passages leading from the force feed chamber to the surfaces of the rotary plug; and Figure 2 is a top plan view of the valve shown in Figure 1, illustrating the toothed plunger and ratchet operator arrangement.

In the drawing wherein for the purpose of illustrating the invention and wherein like reference characters will be employed to designate like parts throughout the same, the reference character 5 will generally be employed to designate a valve casing having a transverse port 6 registering with inlet and outlet threaded connections 7 and 8.

The valve casing 5 is provided with an enlarged head portion 9 and is provided with a central tapered bore 10 extending transversely with respect to the port 6. The upper portion of the tapered bore 10 is reduced as at 11 and the lower portion is enlarged as at 12.

An annular cut-away portion 13 is formed in the upper end of the tapered bore 10 and is adapted to receive a series of packing elements 14 which are V-shaped in cross-section and are interfitted to provide a packing above the passageway 6.

Rotatably mounted in the tapered bore 10 is a valve plug 15 having a transverse opening 16 adapted to align with the passageway 6 for establishing communication between the screw threaded annular bosses 7 and 8 when the valve plug is turned to register therewith. The upper end of the valve plug is provided with a reduced portion 16 which freely rotates in the reduced portion 11 of the casing. The free end of the plug is provided with a wrench-engaging head 17 to facilitate the plug being rotated about a 90° arc from its open to closed position.

After the rotary plug 15 has been placed in the valve body, a series of inter-nested packing elements 18 are placed in the cut-away portion 12 so that they bear against the lower portion of the valve plug. A cover plate 19 is secured to the lower portion of the valve body and is held in place by machine screws 20 extending through the marginal portions of the cover and being anchored in screw threaded openings 21 in the bottom wall of the valve body. Formed integral with the cover plate 19 is an inwardly directed annular flange 22 which is adapted to extend between the valve body and plug and engage the packing 19 in the enlarged portion 12 of the tapered bore 10.

The lower portion of the valve plug is provided with a central opening 23 which extends from the bottom thereof to a point below the transverse port 16 and mounted in the opening is a coil spring 24 having its lower end resting on a circular boss 25 formed on the cover plate 19, while the upper end engages one half of a roller bearing race 27 having roller bearings 28 which cooperate with an upper roller bearing race 29 seated in the upper end of the central opening 23.

Formed in the enlarged portion 9 of the valve casing is a vertical passageway 30 terminating in its upper end in an enlarged chamber 31 having a pressure feed screw 32 threaded therein and said chamber is adapted to contain a lubricant to be fed through a passageway 33 to an annular lubricant receiving passageway 34 formed in the upper portion of the valve plug 15. The annular lubricating passageway 34 is formed above the valve plug port 16 and formed below the valve plug port is a similar annular lubricant receiving groove 35 in registry with an annular lubricant receiving groove 36 formed on the inner wall of the tapered opening 10 below the transverse passageway 6.

Connecting the lubricant receiving grooves 34 and 35 is an arcuately curved passageway 37 extending around the marginal edge of the transverse opening 16 at each end thereof and said connecting passageways 37 are formed so that they extend to the right of the opening 16 at each end thereof.

A lubricant passageway 39 is formed in the enlarged head 9 of the valve body and is disposed diametrically opposite the passageway 33 so that it communicates with a vertical passageway 40 extending into a lubricant receiving chamber 41 formed vertically in the enlarged head 9. A check valve 42 is interposed between the passageways 39 and 40 and is adapted to seat on an apertured disk 43 therein to control the passage of lubricant from the passage 41 to the passage 39.

The lubricant receiving chamber 41 is screw threaded and is adapted to receive a plunger 44 having interrupted screw threads 45 defined by vertical grooves 46. A spring pressed pawl 47 is pivoted, as at 48, to the top wall of the valve casing and is adapted to engage within the grooves 46 to prevent rotation of the screw threaded plunger 44 in a counter-clockwise direction and formed on the upper end 16 of the valve plug 15 is a segment 49 to which is pivoted a pawl 50, as at 51, adapted to engage the groove 46 in the screw threaded plunger 44 to rotate the plunger in a clockwise direction when the valve plug 15 is turned as by means of the wrench-engaging head 17 to its open position. A stop 52 is formed on the segment 49 to engage the pawl 50 so that during the movement of the plug in a counter-clockwise direction, the pawl 50 will remain in engagement with the grooves 46 during a short period of travel and cause rotation to be imparted thereto. A coil spring 53 encircles the pivot 51 and is adapted to normally urge the pawl 50 into engagement with the stop 52.

After the valve plug body 15 has been rotated in a counter-clockwise direction, to rotate the plunger 44 and arrange the valve port 16 in registry with the inlet and outlet ports 7 and 8, the plug 15 may be rotated to its closed position, as shown in Figure 1, and during its travel, the pawl 50 will ride over the plunger 44 without causing rotation thereto.

The winged sector 49 forms an indicator for determining the position of the valve port 16 and the screw 32 may be removed when desired to furnish additional lubricant without requiring the removal of the plunger 44. Also, the screw 32 provides a manual means for feeding lubricant in addition to the plunger 44.

It is to be understood that as the screw threaded plunger 44 is fed downwardly into the lubricant chamber 41, the lubricant may be fed through the passageway 39 to seal the valve port 16 above and below by means of the annular lubricant receiving grooves 34 and 35 whereby the passage of liquid above and below the area confined by the annular grooves 34 and 35 will be sealed against the passage of liquid and as the lubricant passes through the arcuately curved groove 37, it causes the vertical bore on opposite sides of the inlet and outlet ports to be coated with a lubricant.

It is further to be understood that the rotary screw plunger 44 may be arranged in any desired manner and that the form of the invention herewith shown and described is to be taken as a preferred embodiment of the same and that various changes in the shape, size and arrangement of parts may be resorted to without departing from the spirit and scope of the invention as claimed.

I claim:

1. A valve comprising a casing having inlet and outlet ports, a valve plug mounted in the casing and having a transverse bore therethrough for registry with and for controlling the inlet and outlet ports, the plug having annular oil grooves therein respectively at opposite sides of the bore and an arcuate groove adjacent and concentric with the bore at each side of the plug in communication with the annular grooves, the casing having a lubricant chamber therein laterally of the axis of the valve plug and a lubricant-receiving passageway in the casing in communication with said chamber and registering with the adjacent annular groove, and means movable in an axial path parallel with the axis of the valve plug for feeding a lubricant from the chamber through the passageway and grooves in the valve plug to seal the upper and lower ends of the valve plug against passage of liquid.

2. A valve comprising a casing having inlet and outlet ports, a spring seated valve plug rotatably mounted in the casing and having a transverse bore therethrough for registry with and for controlling the ports, the plug having annular oil grooves therein respectively at opposite sides of the bore and an arcuate groove adjacent and concentric with the bore at each side of the plug in communication with the annular grooves, the casing having a lubricant chamber therein laterally of the longitudinal axis of the valve plug and a lubricant-receiving passageway in the casing in communication with said chamber and registering with the adjacent annular groove, and means movable in an axial path parallel with the axis of the valve plug for feeding a lubricant from the chamber through the passageway and grooves to the valve plug to seal the same adjacent the inlet and outlet ports.

RALPH L. KERR.